United States Patent
Stevenson et al.

(10) Patent No.: US 7,322,456 B2
(45) Date of Patent: Jan. 29, 2008

(54) RADIALLY STACKED DUAL DRY CLUTCH CONFIGURATION

(75) Inventors: Paul D. Stevenson, Ann Arbor, MI (US); Joel M. Maguire, Northville, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 296 days.

(21) Appl. No.: 11/238,727

(22) Filed: Sep. 29, 2005

(65) Prior Publication Data

US 2007/0068761 A1 Mar. 29, 2007

(51) Int. Cl.
*F16D 47/00* (2006.01)
*F16D 13/48* (2006.01)
*F16D 23/14* (2006.01)

(52) U.S. Cl. .................... 192/48.91; 74/330; 192/48.8; 192/98

(58) Field of Classification Search ...................... None
See application file for complete search history.

(56) References Cited

U.S. PATENT DOCUMENTS

| | | | | |
|---|---|---|---|---|
| 4,787,492 A | * | 11/1988 | Ball et al. .................. | 192/48.8 |
| 6,644,451 B2 | * | 11/2003 | Grosspietsch et al. ..... | 192/48.8 |
| 2003/0116396 A1 | * | 6/2003 | Kuhstrebe .................. | 192/48.9 |
| 2006/0000684 A1 | * | 1/2006 | Agner et al. ............... | 192/48.8 |

* cited by examiner

*Primary Examiner*—Rodney H. Bonck

(57) ABSTRACT

A radially stacked dual dry clutch apparatus for a dual clutch transmission is provided. The apparatus includes a housing, an outer clutch mounted to the housing, and an inner clutch mounted to the housing. The outer clutch includes a first plurality of engageable clutch plates, and a hub attached to one of the first plurality of clutch plates. The hub preferably defines a plurality of access ports. The inner clutch includes a second plurality of engageable clutch plates. The inner clutch also includes an apply member configured to selectively actuate the second plurality of clutch plates. At least a portion of the apply member is adapted to pass through the access ports of the hub.

18 Claims, 2 Drawing Sheets

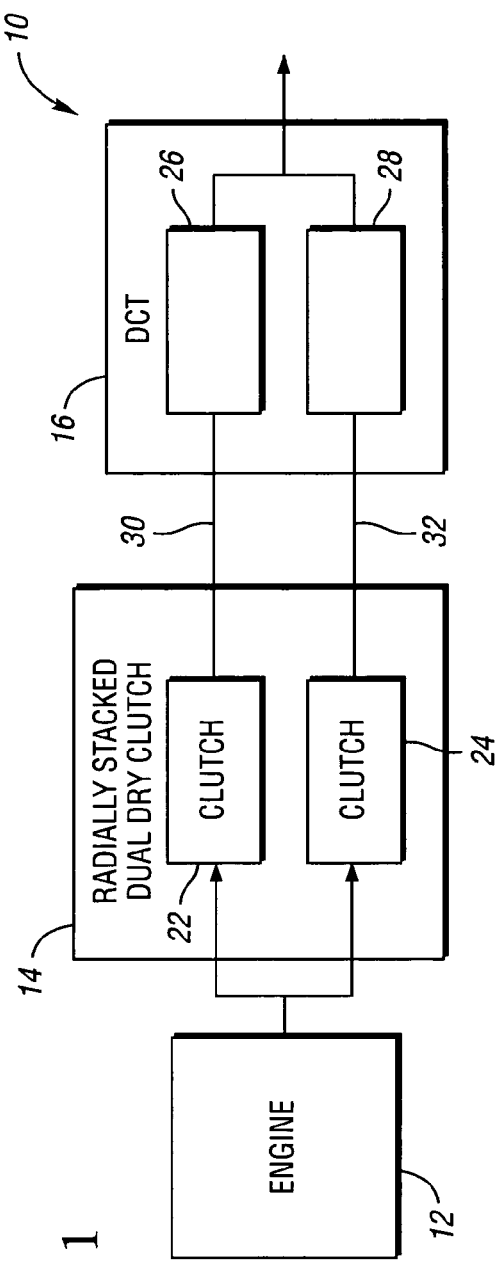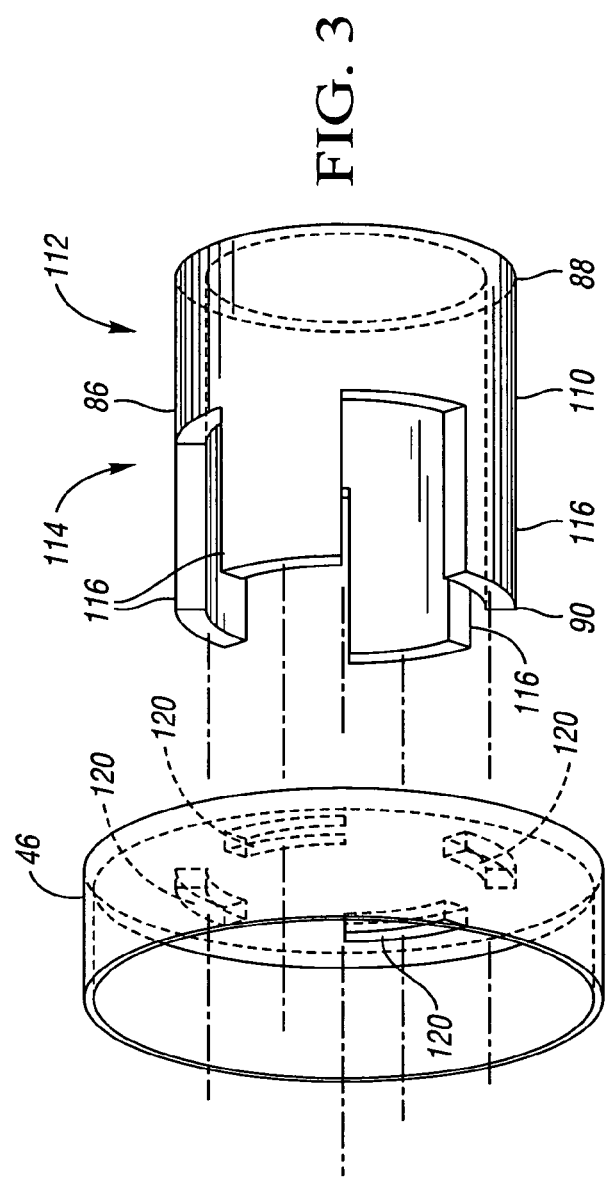

RADIALLY STACKED DUAL DRY CLUTCH CONFIGURATION

TECHNICAL FIELD

The present invention is drawn to a radially stacked dual dry clutch apparatus for a dual clutch transmission.

BACKGROUND OF THE INVENTION

A dual clutch transmission, or DCT, generally implements one clutch for the odd numbered gear ratios, and a second clutch for the even numbered gear ratios such that there is no torque interruption during a ratio change. A "torque interruption" refers to a period during a ratio change wherein the engine is decoupled from the drivetrain so that there is no torque being transferred to the wheels.

The two clutches in a dual clutch transmission are typically either wet or dry clutches, and may be either axially stacked or radially stacked. Dry clutches may be more efficient and less expensive in some applications than a wet clutch. Radially stacked dual clutch transmissions offer packaging advantages over axially stacked dual clutch transmissions. As an example, vehicles requiring a short transmission, such as front wheel drive vehicles, cannot practically package an axially stacked dual clutch configuration.

SUMMARY OF THE INVENTION

The present invention provides a radially stacked dual dry clutch apparatus for a dual clutch transmission. The apparatus includes a housing, an outer clutch mounted to the housing, and an inner clutch mounted to the housing.

The outer clutch includes a first plurality of engageable clutch plates. A first return spring is operatively connected to one of the first plurality of clutch plates, and a hub is attached to another of the first plurality of clutch plates. The hub preferably defines a plurality of access ports. A first output shaft is configured to transfer the rotation of the hub to a first power path.

The inner clutch includes a second plurality of engageable clutch plates. A second return spring is operatively connected to one of the second plurality of clutch plates. The inner clutch also includes an apply member configured to selectively actuate the second plurality of clutch plates. At least a portion of the apply member is adapted to pass through the access ports of the hub. A second output shaft is configured to selectively transfer the rotation of the second plurality of clutch plates to a second power flow path.

According to one aspect of the invention, the apparatus includes a first thrust bearing operatively connected to the first apply spring, wherein the first thrust bearing is configured to facilitate the transfer of an axially applied force between components rotating at different rates.

According to another aspect of the invention, the apparatus includes a first actuator adapted to apply an axial force to the first apply spring such that the first plurality of clutch plates are engaged.

According to yet another aspect of the invention, the apparatus includes a second actuator adapted to apply an axial force to the second apply spring such that the second plurality of clutch plates are engaged.

According to still another aspect of the invention, the apparatus includes a second thrust bearing disposed between the apply member and the second apply spring, and a third thrust bearing disposed between the apply member and the second actuator, wherein the second and third thrust bearings are configured to facilitate the transfer of an axially applied force between components rotating at different rates.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic depiction of a vehicle having a radially stacked dual dry clutch apparatus in accordance with the present invention;

FIG. 3 is a schematic isometric view of an apply member and a clutch hub.

DESCRIPTION OF THE PREFERRED EMBODIMENTS

Figure 2:
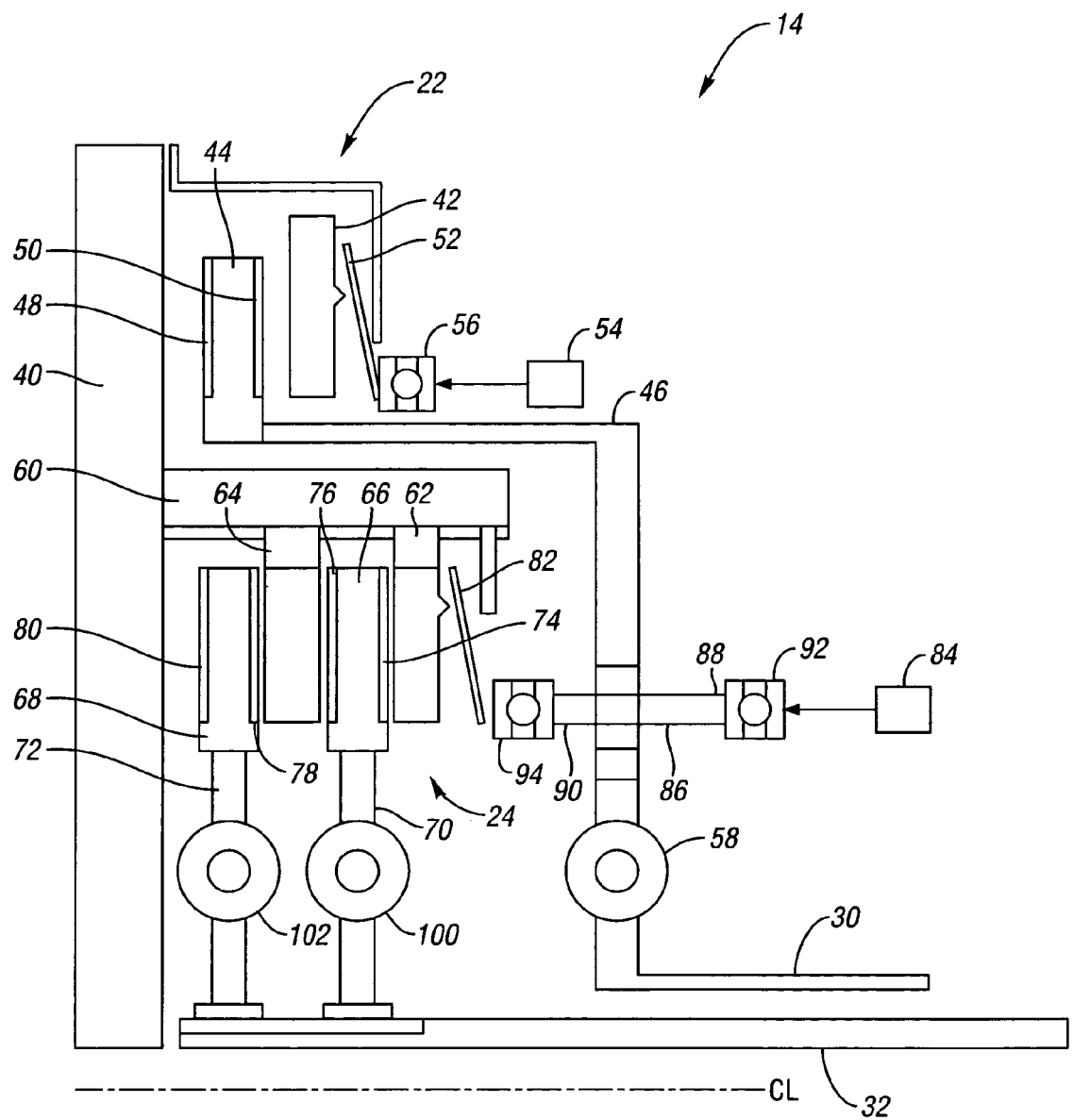
FIG. 2 is a partial sectional view of the radially stacked dual dry clutch apparatus of FIG. 1.

Referring to the drawings wherein like reference numbers refer to like components, FIG. 1 shows a schematic depiction of a vehicle 10 in accordance with the present invention. The vehicle 10 includes an engine 12; a radially stacked dual dry clutch apparatus 14; and a dual clutch transmission 16, or DCT 16. The radially stacked dual dry clutch apparatus 14 includes an outer clutch 22 and an inner clutch 24 as will be described in more detail hereinafter. The DCT 16 includes a first power flow path 26 and a second power flow path 28. According to a preferred embodiment, the power flow path 26 is associated with even gear ratios and the power flow path 28 is associated with odd gear ratios.

The radially stacked dual dry clutch apparatus 14 is configured to receive input torque from the engine 12 and selectively transfer output torque to the DCT 16 via output shaft 30 and/or output shaft 32. More precisely, engine torque is selectively transmitted through clutch 22 via output shaft 30 while one of the even gear ratios is engaged, and engine torque is selectively transmitted through clutch 24 via output shaft 32 while one of the odd gear ratios is engaged. It should be appreciated by one skilled in the art that engine torque may be briefly transmitted to the DCT 16 via both of the output shafts 30, 32 during a ratio change.

Referring to FIG. 2, the upper half of the radially stacked dual dry clutch apparatus 14 is shown in more detail. It should be appreciated that the dual dry clutch 14 is generally symmetrical about the center line CL such that the bottom half of the dual dry clutch (not shown) is similar to that of the upper half shown in FIG. 2.

The outer clutch 22 is preferably a single plate design, whereas the inner clutch 24 is preferably a dual plate design. While other clutch plate configurations may be envisioned, the dual plate design of the inner clutch 24 is preferred because the outer diameter of the clutch 24 is relatively smaller than that of the clutch 22, and the inner clutch 24 therefore has a smaller engagement radius which limits holding capacity. By implementing a dual plate design, the torque capacity of the inner clutch 24 is doubled as compared to a single plate design, and the heat capacity is correspondingly increased.

The radially stacked dual dry clutch 14 includes a housing 40 that is rigidly connected to the engine 12 (shown in FIG. 1) such that the housing 40 rotates at engine speed.

The outer clutch 22 includes a first clutch plate 42 attached to the housing 40 such that the first clutch plate 42 rotates at engine speed. The outer clutch 22 also includes a second clutch plate 44 mounted to a clutch hub 46. The clutch plate 44 and clutch hub 46 are configured to rotate at a plurality of different speeds depending on the currently selected gear speed ratio. The clutch plate 44 includes clutch pads 48, 50. An apply spring 52 operatively connected to the clutch plate 42 is adapted to bias the clutch plate 42 out of engagement with the clutch plate 44. An actuator 54 is adapted to selectively actuate the outer clutch 22 by compressing the apply spring 52 such that the clutch plates 42, 44 engage and rotate as a single member. The actuator 54 is preferably a stationary piston type actuator, however, it should be appreciated that other types of actuators may be implemented as well.

According to a preferred embodiment, a thrust bearing 56 is disposed between the actuator 54 and the apply spring 52. The thrust bearing 56 is implemented to accommodate a speed differential thereacross while transferring force from the actuator 54 to the apply spring 52. In other words, the thrust bearing 56 is implemented to transfer force from the actuator 54, which is preferably stationary (i.e., grounded), to the apply spring 52, which is rotating at engine speed, in order to engage the outer clutch 22.

The clutch hub 46 is operatively connected to one or more damper springs 58. The damper springs 58 are adapted to dampen, or absorb, at least a portion of the torque spike generated during engagement of the clutch 22 and to absorb engine torque pulsations thereby producing smoother vehicle operation. The clutch hub 46 is also operatively connected through the damper springs 58 to the output shaft 30. Accordingly, the rotation of the clutch hub 46 is transferable to the DCT 16 (shown in FIG. 1) via the output shaft 30.

The inner clutch 24 includes a housing member 60 attached to the housing 40 such that the housing member 60 rotates at engine speed. A first pair of clutch plates 62, 64 are rigidly mounted to the housing member 60. The inner clutch 24 also includes a second pair of clutch plates 66, 68 respectively mounted to a pair of clutch hubs 70, 72. The clutch plates 66, 68 and clutch hubs 70, 72 are configured to rotate at a plurality of different speeds depending on the currently selected gear speed ratio. The clutch plate 66, includes clutch pads 74, 76, and the clutch plate 68 includes clutch pads 78, 80. An apply spring 82 operatively connected to the clutch plate 62 is adapted to bias the clutch plates 62, 64 out of engagement with the clutch plates 66, 68. An actuator 84 is adapted to selectively actuate the inner clutch 24 by compressing the apply spring 82 such that the clutch plates 62, 64 engage the clutch plates 66, 68. The actuator 84 is preferably a stationary piston type actuator, however, it should be appreciated that other types of actuators may be implemented as well.

An apply member 86 is preferably disposed through the hub 46 between the actuator 84 and the apply spring 82 to facilitate the transfer of force therebetween. The apply member 86 includes an end portion 88 near the actuator 84 and an opposite end portion 90 near the apply spring 82. A thrust bearing 92 is disposed between the actuator 84 and the end portion 88 of the apply member 86. A thrust bearing 94 is disposed between the apply spring 82 and the end portion 90 of the apply member 86.

The thrust bearings 92, 94 are adapted to accommodate a speed differential thereacross while facilitating the transfer of force from the actuator 84 to the apply spring 82. In other words, the thrust bearing 92 is implemented to transfer force from the actuator 84, which is stationary (i.e., grounded), to the apply member 86, which may be rotating at an intermediate speed between zero and engine speed depending on the currently selected gear ratio. Similarly, the thrust bearing 94 is implemented to transfer force from the apply member 86, which may be rotating at an intermediate speed, to the apply spring 82, which is rotating at engine speed. Therefore, by implementing the thrust bearings 92, 94, force is transferable from the actuator 84, through the apply member 86, and to the apply spring 82, despite the fact that the respective components through which force is transferred are not rotating at a common speed.

The clutch hub 70 is operatively connected to one or more damper springs 100, and the clutch hub 72 is operatively connected to one or more damper springs 102. The damper springs 100, 102 are adapted to dampen, or absorb, at least a portion of the torque spike generated during engagement of the clutch 24 and absorb engine torque pulsations thereby providing smoother vehicle operation. The clutch hubs 70, 72 are both operatively connected through the damper spring 100, 102 to the output shaft 32. Accordingly, the rotation of the clutch hubs 70, 72 is transferable to the DCT 16 (shown in FIG. 1) via the output shaft 32.

The manner in which force is transferable by the apply member 86 and through the clutch hub 46 is shown more clearly in FIG. 3. The apply member 86 includes the end portion 88, the end portion 90 and a middle portion 110 located generally halfway therebetween. The apply member 86 is composed of two distinct portions, a first portion 112 defined between the end portion 88 and the middle portion 110, and a second portion 114 defined between the middle portion 110 and the end portion 90. The first portion 112 of the apply member 86 is generally a hollow cylindrical design. The second portion 114 of the apply member 86 is composed of a plurality of fingers 116 axially extending from the middle portion 110 and forming a castellated type design.

The hub 46 defines a plurality of access ports 120 adapted to accommodate the fingers 116 of the apply member 86. The fingers 116 of the apply member 86 are each inserted through one of the access ports 120 of the hub 46. In this manner, the apply member 86 and the hub 46 rotate together, but the apply member 86 is axially translatable relative to the hub 46 by varying the degree of insertion of the fingers 116 through the access ports 120. Force applied by the actuator 84 (shown in FIG. 2) may induce this axial translation. The axial translation of the apply member 86 relative to the hub 46 transfers the force applied by the actuator 84 by pushing the thrust bearing 94 into engagement with the apply spring 82. In this manner, a force applied by the actuator 84 is transferable through the clutch hub 46 to the apply spring 82 (shown in FIG. 2) in order to engage the clutch 24, and this force is transferable even if the actuator 84, the clutch hub 46 and the apply spring 82 are rotating at different rates.

While the best modes for carrying out the invention have been described in detail, those familiar with the art to which this invention relates will recognize various alternative designs and embodiments for practicing the invention within the scope of the appended claims.

The invention claimed is:

1. A radially stacked dual dry clutch apparatus comprising:

a housing;
   an outer clutch mounted to the housing, said outer clutch including;
      a first plurality of engageable clutch plates; and
      a hub attached to one of said plurality of clutch plates, said hub defining a plurality of access ports; and an inner clutch mounted to the housing at a radially inner position relative to the outer clutch, said inner clutch including;

a second plurality of engageable clutch plates; and an apply member configured to selectively actuate said second plurality of clutch plates, at least a portion of the apply member being adapted to pass through the access ports of the hub.

2. The apparatus of claim 1 further comprising a first apply spring operatively connected to one of said first plurality of clutch plates, said first apply spring configured to mechanically bias said first plurality of clutch plates out of engagement.

3. The apparatus of claim 2 further comprising a first thrust bearing operatively connected to the first apply spring, said first thrust bearing configured to facilitate the transfer of an axially applied force between components rotating at different rates.

4. The apparatus of claim 3 further comprising a first actuator adapted to apply an axial force through said first thrust bearing to said first apply spring such that the mechanical bias applied by the first apply spring is overcome and the first plurality of clutch plates are engaged.

5. The apparatus of claim 4 further comprising a second apply spring operatively connected to one of said second plurality of clutch plates, said second apply spring configured to mechanically bias said second plurality of clutch plates out of engagement.

6. The apparatus of claim 5 further comprising a second actuator adapted to apply an axial force through said apply member to said second apply spring such that the mechanical bias applied by the second apply spring is overcome and the second plurality of clutch plates are engaged.

7. The apparatus of claim 6 further comprising a second thrust bearing disposed between the apply member and the second apply spring, and a third thrust bearing disposed between the apply member and the second actuator, said second and third thrust bearings being configured to facilitate the transfer of an axially applied force between components rotating at different rates.

8. The apparatus of claim 1 further comprising a first output shaft operatively connected to said hub and a first power flow path such that rotation of the hub is transferable to the first power flow path.

9. The apparatus of claim 1 further comprising a second output shaft operatively connected to one of said second plurality of clutch plates and a second power flow path such that rotation of the second plurality of clutch plates is transferable to the second power flow path.

10. A radially stacked dual dry clutch apparatus comprising:

a housing;

an outer clutch mounted to the housing, said outer clutch including;

a first plurality of engageable clutch plates;

a first apply spring operatively connected to one of said first plurality of clutch plates; and a hub attached to another of said plurality of clutch plates, said hub defining a plurality of access ports; and an inner clutch mounted to the housing at a radially inner position relative to the outer clutch, said inner clutch including;

a second plurality of engageable clutch plates;

a second apply spring operatively connected to one of said second plurality of clutch plates; and an apply member configured to selectively actuate said second plurality of clutch plates, at least a portion of the apply member being adapted to pass through the access ports of the hub.

11. The apparatus of claim 10 further comprising a first thrust bearing operatively connected to the first apply spring, said first thrust bearing configured to facilitate the transfer of an axially applied force between components rotating at different rates.

12. The apparatus of claim 11 further comprising a first actuator adapted to apply an axial force through said first thrust bearing to said first apply spring such that the first plurality of clutch plates are engaged.

13. The apparatus of claim 12 further comprising a second actuator adapted to apply an axial force through said apply member to said second apply spring such that the second plurality of clutch plates are engaged.

14. The apparatus of claim 13 further comprising a second thrust bearing disposed between the apply member and the second apply spring, and a third thrust bearing disposed between the apply member and the second actuator, said second and third thrust bearings being configured to facilitate the transfer of an axially applied force between components rotating at different rates.

15. A radially stacked dual dry clutch apparatus comprising:

a housing;

an outer clutch mounted to the housing, said outer clutch including;

a first plurality of engageable clutch plates;

a first apply spring operatively connected to one of said first plurality of clutch plates;

a first thrust bearing operatively connected to the first apply spring, said first thrust bearing configured to facilitate the transfer of an axially applied force between components rotating at different rates; and a hub attached to another of said plurality of clutch plates, said hub defining a plurality of access ports; and an inner clutch mounted to the housing at a radially inner position relative to the outer clutch, said inner clutch including;

a second plurality of engageable clutch plates;

a second apply spring operatively connected to one of said second plurality of clutch plates;

an apply member configured to selectively actuate said second plurality of clutch plates, at least a portion of the apply member being adapted to pass through the access ports of the hub; and a second thrust bearing disposed between the apply member and the second apply spring, said second thrust bearing configured to facilitate the transfer of an axially applied force between components rotating at different rates.

16. The apparatus of claim 15 further comprising a first actuator adapted to apply an axial force through said first thrust bearing to said first apply spring such that the first plurality of clutch plates are engaged.

17. The apparatus of claim 16 further comprising a second actuator adapted to apply an axial force through said apply member to said second apply spring such that the second plurality of clutch plates are engaged.

18. The apparatus of claim 17 further comprising a third thrust bearing disposed between the apply member and the second actuator, said third thrust bearing being configured to facilitate the transfer of an axially applied force between components rotating at different rates.

* * * * *